(12) United States Patent
Dickinson et al.

(10) Patent No.: US 6,287,197 B1
(45) Date of Patent: Sep. 11, 2001

(54) VIDEO GAME WITH RANDOMLY GENERATED IMAGES

(75) Inventors: Vince Dickinson; Lauren Goldberg, both of Chicago, IL (US)

(73) Assignee: Midway Games Inc., Chicago, IL (US)

( * ) Notice: Subject to any disclaimer, the term of this patent is extended or adjusted under 35 U.S.C. 154(b) by 0 days.

(21) Appl. No.: 09/135,700

(22) Filed: Aug. 18, 1998

(51) Int. Cl.⁷ .................................................. A63F 9/22
(52) U.S. Cl. ........................ 463/31; 463/9; 273/273; 434/169; 434/172; 434/184
(58) Field of Search ................... 463/31; 273/273; 434/169, 172, 184

(56) References Cited

U.S. PATENT DOCUMENTS

| | | | |
|---|---|---|---|
| 4,045,884 | * 9/1977 | Zand | 35/35 R |
| 4,498,869 | * 2/1985 | Faison | 434/184 |
| 4,710,873 | * 12/1987 | Breslow et al. | 364/410 |
| 5,411,271 | * 5/1995 | Mirando | 273/434 |
| 5,456,607 | * 10/1995 | Antoniak | 434/323 |
| 5,485,176 | * 1/1996 | Ohara et al. | 345/173 |
| 5,531,441 | * 7/1996 | Dabrowski et al. | 463/12 |
| 5,591,081 | * 1/1997 | Suzuki | 463/13 |
| 5,595,389 | * 1/1997 | Parulski et al. | 463/31 |
| 5,630,753 | * 5/1997 | Fuchs | 463/9 |
| 5,816,915 | * 10/1998 | Kadlic | 463/13 |
| 5,823,873 | * 10/1998 | Moody | 463/13 |

OTHER PUBLICATIONS

Concorde 2 Operator's Manual, © Dec. 1997 JVL Enterprises Ltd., p. 17.
Megatouch XL sell sheet, ©1997 Merit Industries.
"Description of Other Matching Type Games".

* cited by examiner

*Primary Examiner*—Valencia Martin-Wallace
*Assistant Examiner*—Carmen D. White
(74) *Attorney, Agent, or Firm*—Jenkens & Gilchrist (57) ABSTRACT

A system for generating video pictures including various images. The system defines a target number of video images eligible for display, identifies target display positions for the images and selects various basic images from game memory. A number of change candidates is selected from among the basic images eligible for display and a change option is selected for each change candidate. The selected change options are executed to define a number of changed images, which may then be displayed with a number of the basic images to define the video pictures. The display system may be advantageously employed to generate pictures in a video game in which points are awarded for identifying the changed images.

31 Claims, 5 Drawing Sheets

| THEME | IMAGES | Level A | Level B | Level C |
|---|---|---|---|---|
| Fish | 3 | 10 | 13 | 15 |
| Robots | 6 | 15 | 18 | 20 |
| Dice | 24 | 14 | 16 | N/A |
| Balls | 6 | 16 | 25 | N/A |
| Blocks | 10 | 16 | 18 | 25 |
| Heads | 12 | 12 | 16 | 25 |
| Mouths | 6 | 10 | 14 | 16 |
| Frogs | 6 | 13 | 15 | 18 |
| Fast Food | 7 | 13 | 15 | 18 |
| Hands and Feet | 10 | 13 | 16 | N/A |
| Squares | 6 | 12 | 15 | 20 |
| Popcorn (large) | 8 | 9 | 11 | 14 |
| Popcorn (small) | 8 | 15 | 20 | 25 |
| Mah Jongg Tiles | 36 | 10 | 13 | 15 |
| Fruit | 4 | 9 | 11 | 13 |

… 
VIDEO GAME WITH RANDOMLY GENERATED IMAGES

FIELD OF THE INVENTION

The present invention relates generally to video games and, more particularly, to an image generation and display system for video games.

BACKGROUND OF THE INVENTION

All modern video games include a display for displaying various video images according to a game program. The images may include, for example static or animated characters, background graphics and/or text. Typically, the types of images available for display are stored in a game memory operably coupled to a game controller, and the sequence for displaying the images is determined by the game program in response to player inputs. Generally, it is desirable to maximize the numbers and types of images which may be displayed by a particular game, to provide greater flexibility for game designers and to provide games which are more likely to appeal to players. Heretofore, however, the numbers and types of images which may be displayed by a particular game has been limited by the storage capacity of the game memory. Accordingly, game designers have been forced to either limit the number(s) and type(s) of images which are displayed by their games corresponding to the capacity of their game memory or, conversely, to use game memories having very large capacities to accommodate games using large numbers of images. Nevertheless, even the highest-capacity memories are capable of storing only a finite number of images and thereby limit the flexibility of the game designer.

Accordingly, there is a need for an image generation and display system for video games having the capacity to generate and display virtually unlimited numbers and types of images and which may be employed with game memories of virtually any standard type or capacity. The present invention is directed to satisfying these needs.

SUMMARY OF THE INVENTION

In accordance with one aspect of the present invention, there is provided a method and apparatus for generating a video game display defining a number of pictures. The method includes the steps of defining target numbers of video images, defining target display positions for the images and identifying a number of basic images from which the pictures are to be derived. A number of change candidates are selected from among the basic images and change option(s) are selected for each respective change candidate. Execution of the selected change option(s) defines a number of changed images eligible for display. A game controller thereafter generates a display consisting of a number of the changed images and a number of the basic images displayed at selected target display positions. In one embodiment, the display consists of two adjacent pictures having images displayed at corresponding display positions defining a plurality of image pairs. The image pairs in one embodiment comprise a first number of matching image pairs and a second number of non-matching image pairs, wherein the matching image pairs consist of identical basic images in each picture and wherein the non-matching image pairs consist of one basic image and one changed image in each picture.

In accordance with another aspect of the present invention, there is provided a touch-screen video game operable in a one-player or two-player mode. The video game includes a processor for generating first and second video pictures on a single display, each of the video pictures including a plurality of selectable images. In one embodiment, the pictures define in combination a plurality of image pairs, including a first number of matching image pairs and a second number of non-matching image pairs. In the two-player mode, the images associated with the first video picture are selectable by a first player and the images associated with the second video picture are selectable by a second player, respectively, by pressing the touch screen.

BRIEF DESCRIPTION OF THE DRAWINGS

The foregoing and other advantages of the invention will become apparent upon reading the following detailed description and upon reference to the drawings in which.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Figure 1:
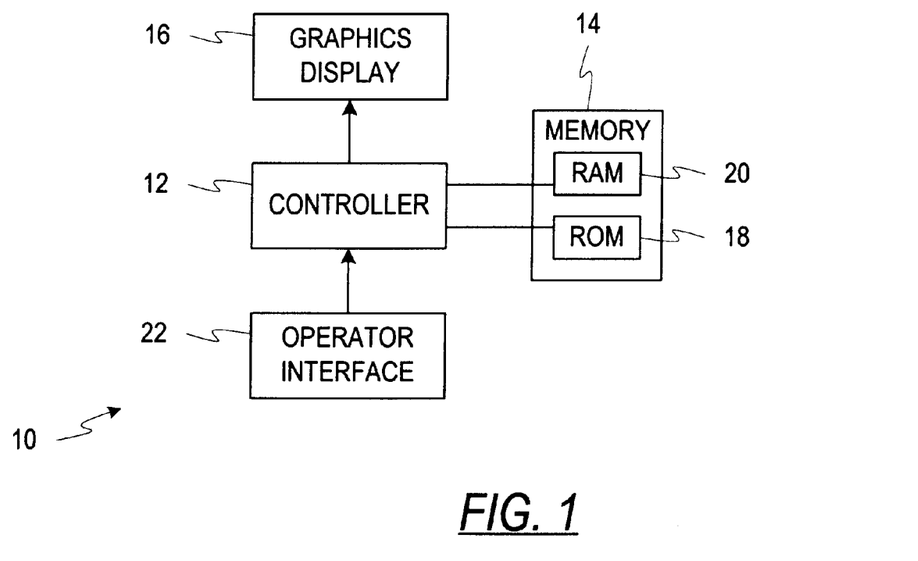
FIG. 1 is a block diagram of a video game in which the present invention may be employed.

Turning now to the drawings and referring initially to FIG. 1, there is shown a block diagram of a video game, designated generally by reference numeral 10, on which the present invention may be employed. The video game 10 may comprise virtually any type and/or size of video game including, for example, coin operated video games, hand-held video games, microprocessor or PC-driven video games. The video game 10 includes a game controller 12 operably coupled to a memory unit 14 and a graphics display 16. The memory unit 14 stores control software, operational instructions and data associated with the video game 10. In one embodiment, the memory unit 14 includes a game memory 18 and a score memory 20. The game memory 18 stores a game code and graphics associated with a video game or group of video games. The score memory 20 contains score information including high score player identifiers and high scores obtained in prior plays of the video game. The score information may also include dates and/or times associated with the scores in the score memory 20.

In the illustrated embodiment, the game memory 18 comprises a read-only memory (ROM) and the score memory 20 comprises a battery-backed random access memory (RAM). However, it will be appreciated that the game memory 18 and score memory 20 may be implemented on alternative types of memory structures (e.g., hard disk, CD ROM, flash card or any other storage media known in the art) or may be integrated on a single memory structure. The game memory 18, where implemented in ROM, is non-volatile (e.g., its data content is preserved without requiring connection to a power supply) and is generally unalterable while it remains within the video game 10. The score memory 20, where implemented in battery-backed RAM, is volatile but retains its data content as long as power is provided, either from an external power source or the battery back-up. The score memory 20 is alterable by the controller 12 when appropriate (e.g., to update the top ten players and scores when a "new" high score is achieved).

The game controller 12 controls play of a video game responsive to player inputs provided through an operator interface 22. The game controller 12 may comprise a microcomputer, microprocessor or any other suitable device for executing control of a video game. The operator interface 22 may comprise any combination of push buttons, joysticks, keypads, touch-screens and the like. The game controller 12 executes control software in the game memory 18 according to the player inputs and communicates the resulting video game play activity including, for example, text, animations and background graphics to the graphics display 16. As will be described in relation to FIGS. 3 and 4, the game controller 12 is capable of generating a virtually unlimited number of images to be displayed on the graphics display 16, both during active play of the video game and during attract mode sequence(s) simulating active game play. The graphics display 16 may comprise a CRT, LED, LCD, dot-matrix, or any other type of display known in the art.

Figure 2:
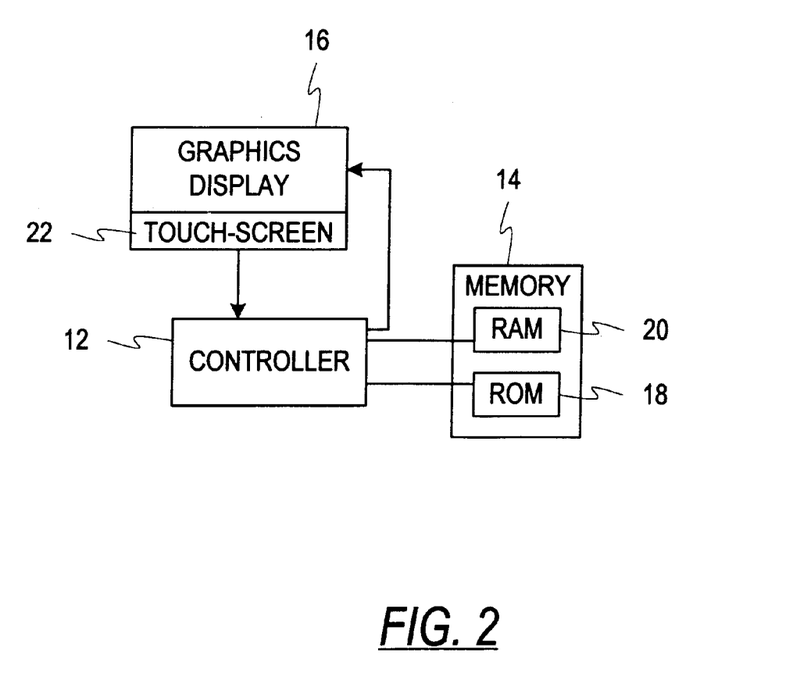
FIG. 2 is a block diagram of a video game having a touch-screen in which the present invention may be employed.

FIG. 2 illustrates a video game 10 having generally the same components as in FIG. 1, but in which the operator interface 22 comprises a touch-screen overlying the display 16 and electrically coupled to game controller 12. A memory 14, including a game memory 18 and a score memory 20, is coupled to the controller 12 in substantially the same manner as in FIG. 1. The controller 12 executes control software in the game memory 18 according to the player inputs in substantially the same manner as in FIG. 1, with the exception that player inputs are provided by touching the touch screen 22 at touch points above various "keys" or key outlines or other specified areas on the display 16.

The controller 12 may be programmed to display the various "keys" or key outlines (not shown) on the graphics display 16 and to recognize the locations of the "keys," key outlines, or other specified areas of the graphics display 16 according to control software in the game memory 18. The "keys" or key outlines, if used, may be displayed both during attract mode and during active play of the game. The "keys" may simulate the appearance of an actual key or may comprise game symbols and/or characters shown on the graphic display 16. For example, in a video game displaying static images (such as the MIRROR, MIRROR™ game to be described in relation to FIGS. 4 and 5), key outlines may comprise areas of the display 16 on which the static image(s) are displayed.

The touch screen 22 defines an X-Y matrix of touch responsive points positioned adjacent to and overlying the "keys" of the display 16. In one embodiment, the touchscreen 22 comprises a ClearTek® capacitive touchscreen, commercially available from MicroTouch Systems, Inc., Methuen, Mass. It will be appreciated, however, that other types or models of touchscreens known in the art may be used. In the ClearTek® touch screen 22, voltage is applied to the four corners of the touch screen to create a uniform voltage field about the touch screen 22. When pressure from a finger or stylus is applied to a selected touch point of the touch screen 22, current is drawn from the sides of the touch screen 22 in proportion to the distance of the touch point from the edge of the touch screen. A touch screen controller (not shown) evaluates the current flow to detect the coordinates of the touch point. The game controller 12 determines whether the touch point coincides with any "key(s)" on the underlying display 16 and, if so, performs a function or functions (e.g., a designated game activity) associated with that displayed "key." Thus, pressing the touch screen 22 at a location above a displayed "key" outline causes the game controller 12 to perform the function associated with that displayed "key." Hereinafter, references to pressing a displayed key denote that an operator is pressing the touch screen 22 at a location above the displayed key outline.

In a video game, pressing of a particular "key" generally causes the game controller 12 to trigger display of game activity on the graphic display 16. The game activity may cause the game controller 12 to periodically redefine key outlines, displays and/or functions associated with the game. For example, in a video game displaying static images (such as the MIRROR, MIRROR™ to be described in relation to FIGS. 3–6), the controller 12 might initially define "keys" corresponding to certain ones of the images and, upon the player pressing certain of these "keys," the controller might alter the display (e.g., by highlighting the selected image(s) in some manner) and/or increment the player's score. The controller 12 might also alter the function of the displayed "key" once it is depressed. For example, in the MIRROR, MIRROR™ game, once the displayed "key" is depressed and thereafter highlighted, the controller 12 disables that "key" so that no function is performed by pressing the key a second, third, etc. time.

Figure 3:
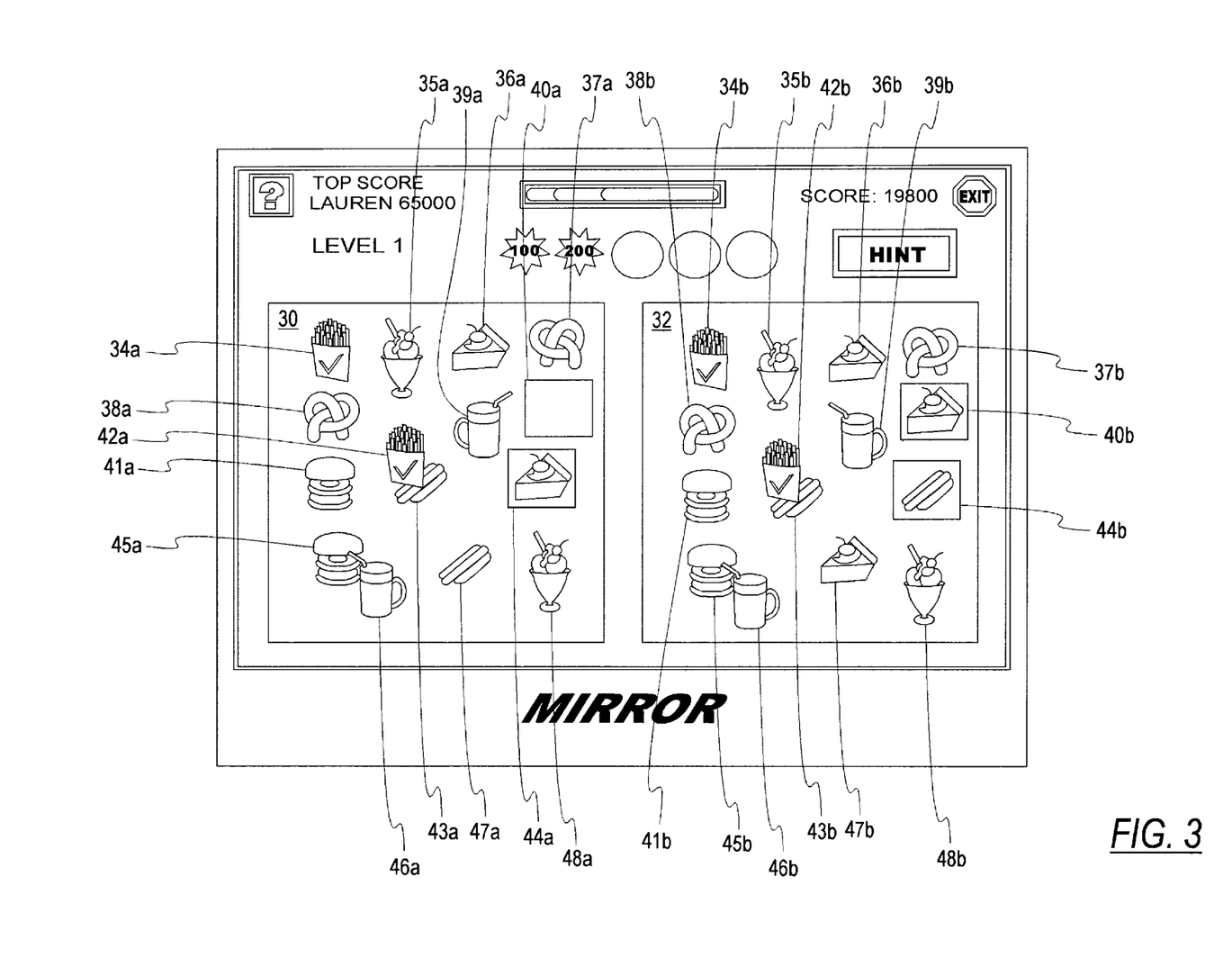
FIG. 3 is a front view of a display screen of a video game entitled MIRROR, MIRROR™ which is useful for describing the image generation and display system according to one embodiment of the present invention.

Turning now to FIG. 3, there is shown a display screen associated with a video game entitled MIRROR, MIRROR™ in which the image generation and display system of the present invention may be implemented. The MIRROR, MIRROR™ game is commercially available from the assignee of the present invention, Midway Games Inc. of Chicago, Ill. As shown in FIG. 3, the MIRROR, MIRROR™ game includes two side-by-side picture fields 30, 32 (hereinafter "pictures"), each containing a number of static images representing a particular theme. The theme of the images shown in FIG. 3 is "fast food." Other themes and images are available according to the game program, as will be described in relation to FIG. 4. The MIRROR, MIRROR™ game is adapted for play in either a one-player mode or two-player mode, as will be described in relation to FIG. 6.

The combination of pictures 30,32 in the MIRROR, MIRROR™ game defines a plurality of pairs of images displayed at corresponding display locations in the respective pictures 30,32. There are 15 such pairs of images shown in the example display screen of FIG. 3. Some of the pairs of images define matching pairs of images (e.g., where the corresponding images in pictures 30 and 32 identically match each other) and some of the pairs of images define non-matching pairs (e.g., where the corresponding images in pictures 30 and 32 differ in some way). Generally, the object of the MIRROR, MIRROR™ game is to identify the non-matching pairs of images displayed in pictures 30,32. In FIG. 3, there are five non-matching pairs of images, specifically the image pairs 37a,b, 39a,b, 40a,b, 44a,b and 47a,b. Images 37a and 37b do not match because image 37a shows a pretzel with a thicker end to the right and image 37b shows a pretzel with a thicker end to the left; images 39a and 39b do not match because image 39a shows a mug with a straw tilted to the right and image 39b shows a mug with a straw tilted to the left; images 40a and 40b do not match because image 40a shows no image (i.e., is turned "off") and image 40b shows a piece of pie; images 44a and 44b do not match because image 44a shows a piece of pie and image 44b shows a hot dog; and images 47a and 47b do not match because image 47a shows a hot dog and image 47b shows a piece of pie. All of the remaining image pairs 34a,b, 35a,b, 36a,b, 38a,b, 41a,b, 42a,b, 43a,b, 45a,b, 46a,b and 48a,b define matching pairs of images.

In a preferred embodiment, the MIRROR, MIRROR™ is implemented with a touch-screen display, and the identification of non-matching portions of the pictures 30, 32 is accomplished by pressing the touch screen above the appropriate portions of the pictures 30, 32. Upon touching the touch-screen over the non-matching portions of the pictures 30, 32, the images are highlighted (e.g., with a box surrounding the corresponding images) and the player's score is incremented as appropriate. In the illustrated embodiment, such highlighted images are shown over image pairs 40a,b and 44a,b, indicating that only those image pairs have been selected thus far in the game. Of course, other than a touch-screen, any of several alternative methods may be employed to identify non-matching portions of the display. In an embodiment employing a mouse and cursor, for example, identification of non-matching portions of pictures 30, 32 may be accomplished by depressing the mouse button when the cursor is displayed over the non-matching portions of the display.

Figure 5:
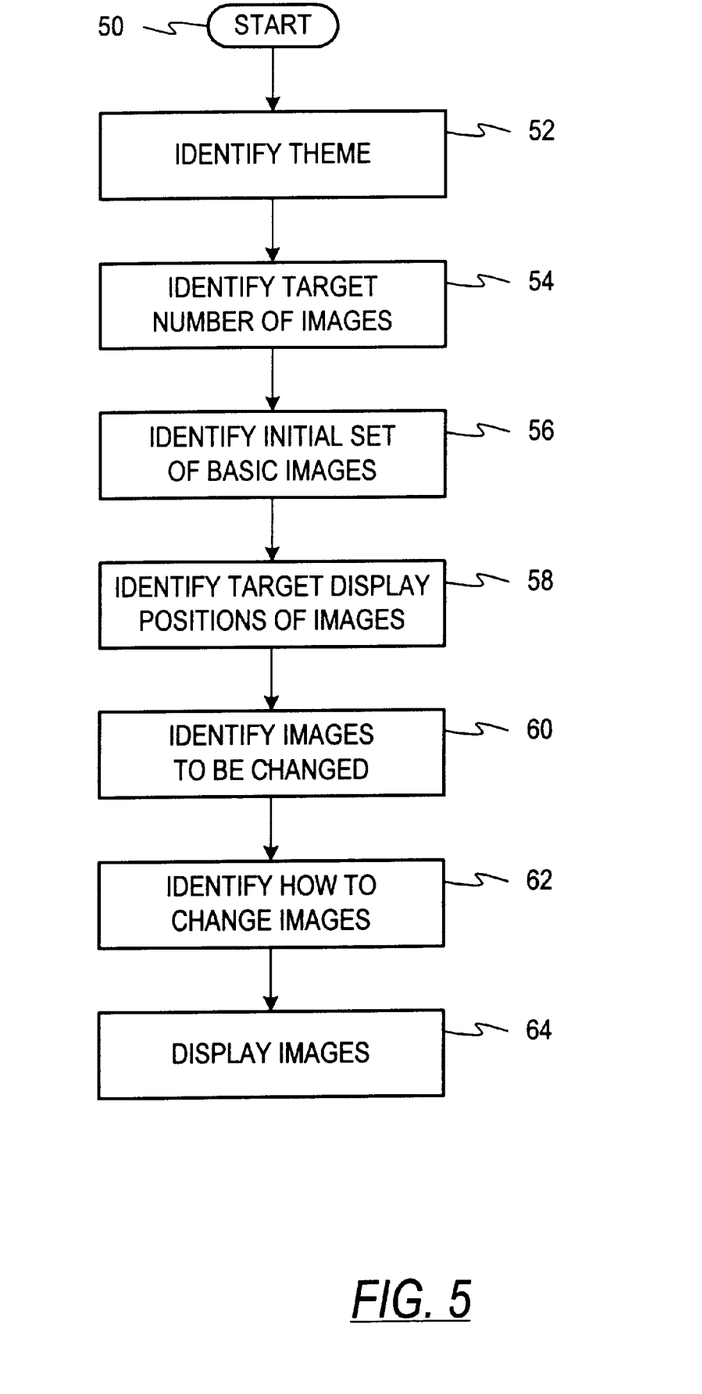
FIG. 5 is a flow diagram showing various aspects of operation of the image generation and display system of the present invention.

Now turning to FIG. 5, the various aspects of operation of the image generation and display system of the present invention will be described with reference to the MIRROR, MIRROR™ game. It will be appreciated, however, that the present invention is not limited to use with the MIRROR, MIRROR™ game or any other specific video game, but rather may be implemented in virtually any video game which is to display multiple images.

The image set-up process is triggered at step 50, by a player starting an active game, starting a new level of an active game, or by the controller initiating an attract mode sequence simulating an active game. Each of the aspects of the image generation and display system will hereinafter be described in relation to active game play, but it will be understood that each aspect is also applicable to attract mode sequences simulating actual game play. Game play may be initiated by depressing a designated start game "key" on the touch-screen 22, depressing a button, or by any other standard means. In embodiments offering a choice of a plurality of different games, a game selection "menu" may be provided in which the player selects a particular game. In such embodiments, the start of the game may be accomplished coincident to the selection of the game from the game selection menu or by depressing a separate start game "key," outside of the game selection menu.

Figure 4:
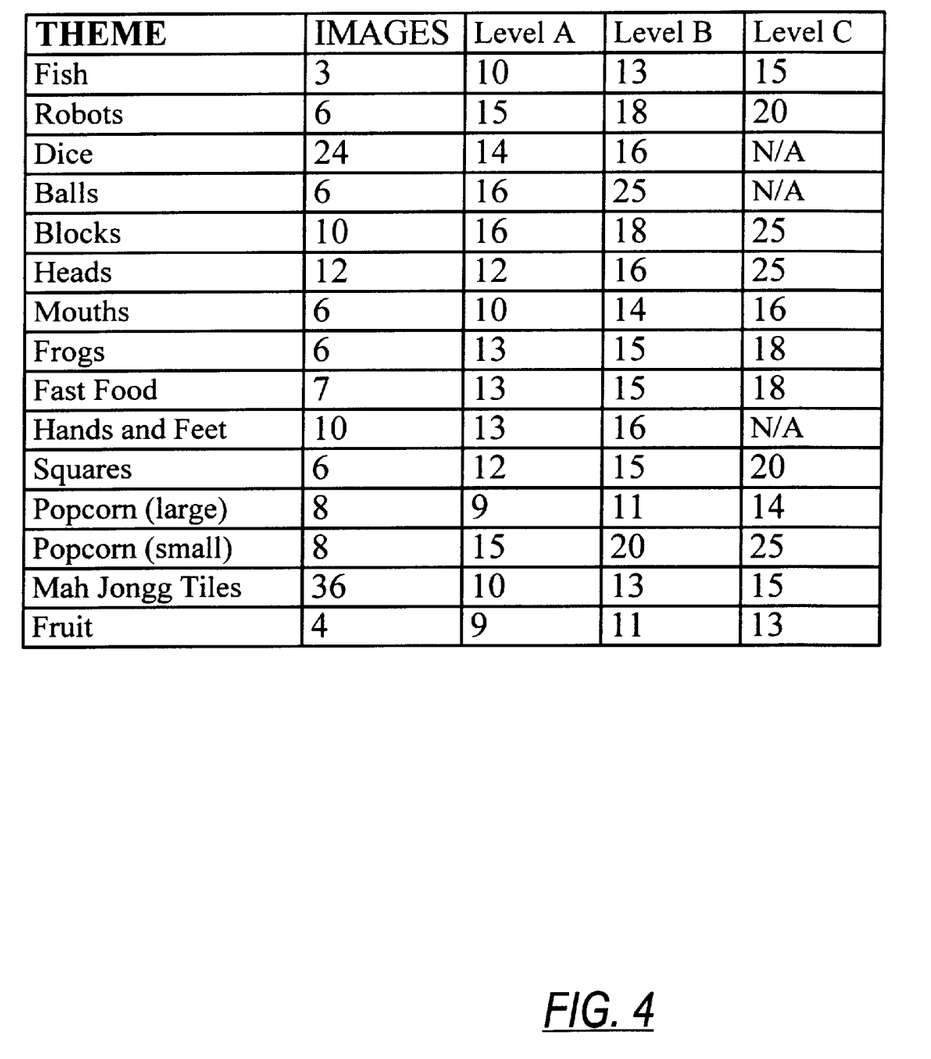
FIG. 4 is a table showing various number(s) and types of images available for display according to one embodiment of the MIRROR, MIRROR™ game implementing the image generation and display system of the present invention.

In step 52, the graphic theme of a particular game or level of the game is identified. The number(s) and type(s) of available themes for a particular game are predetermined according to the game program and stored in the game memory. The step of identifying a theme may be accomplished upon beginning a game or level of a game or upon beginning an attract mode sequence simulating an active game. In one embodiment, the theme for any particular level is randomly selected by the game controller from a look-up table of available themes stored in the game memory. Alternatively, the theme(s) may be predetermined for each level according to the game program, or the theme(s) might be selected by the player. A table showing the available themes in one embodiment of the MIRROR, MIRROR™ game and numbers of images for each theme is shown at FIG. 4. The available themes in this embodiment include: Fish, Robots, Dice, Balls, Blocks, Heads, Mouths, Frogs, Fast Food, Hands and Feet, Squares, Popcorn (large), Popcorn (small), Mah Jongg Tiles and Fruit. In the illustrated example shown at FIG. 3, the selected theme is "Fast Food." In one embodiment, the selection of themes is substantially random from among the available themes, with the exception that the same theme is never selected twice in a row, e.g., in two consecutive levels of game play. It will be appreciated that in video games having images which are not categorized according to themes, step 52 does not apply and the system proceeds directly to step 54.

In step 54, the controller identifies a target number of images which are eligible for display. In one embodiment, the target number is predetermined according to the game program and stored in the game memory. The target number may be fewer or greater than the number of types of basic images available for a particular theme. The number(s) of basic images available in one embodiment of the MIRROR, MIRROR™ game for selected themes is shown in the "IMAGES" column of FIG. 4. The target number of images which are eligible to be displayed may vary from about eight to twenty-five images per picture 30,32 selected from among the available basic images depending on the theme, the size of the images and level of the game in which the images are to be displayed.

In one embodiment of the MIRROR, MIRROR™ game, the target number of images eligible for display to form the pictures 30,32 generally increases according to the game program as the player progresses through various game levels, according to the table shown in FIG. 4. "Level A," "Level B" and "Level C" identify various game levels of the MIRROR, MIRROR™ game which display greater numbers of images and thereby cause the game to become progressively more difficult with each level. For example, if "Fruit" is the selected theme, then for rounds 1–5 (Level A), the target number for each picture 30,32 is nine. On rounds 6–10 (Level B), the target number is 11 and beyond round 10 (Level C), the target number is 13 images per picture 30,32. Note that Levels A, B and C may comprise different rounds from theme to theme, and some levels may have different numbers of levels. For example, if "Dice" is the theme, there are only two levels, Level A and Level B. In rounds 1–8 (Level A), there are 14 images of dice and beyond round 8 (Level B), there are 16 images of dice comprising each picture 30,32.

It must also be noted that the number of images ultimately displayed by the controller may be less than the target number, for reasons which will be described in relation to step 62. For instance, in the example MIRROR, MIRROR™ display of FIG. 3, it may be observed that there are 14 images shown on picture 30 and 15 images displayed on picture 32. In this example, it is known according to the game logic that the controller had identified a target number of fifteen images eligible for display per picture 30,32.

At step 56, the controller selects an initial set of basic images corresponding in number to the target number. In the MIRROR, MIRROR™ game, this initial set of basic images comprises an initial set of matching image pairs for pictures 30,32. For example, where the target number is fifteen per picture, the controller selects fifteen matching pairs of images (thirty total images) eligible for display. In one embodiment, the controller randomly selects the initial set of basic images (or image pairs) from a number of available basic images stored in game memory according to the particular theme identified at step 52, until reaching the number of images determined at step 54.

It should be understood that the initial set of basic images identified at step 56 generally are not the images which will ultimately be displayed. Although some of the basic images will generally be displayed, some of the basic images may be changed, as will be described in relation to steps 60 and 62. For instance, among the twenty-nine total images (fourteen in picture 30, fifteen in picture 32) shown in the example MIRROR, MIRROR™ display of FIG. 3, twenty-five of the images represent basic images which have been unchanged from the initial set: french fries (images 34a,b and 42a,b) sundaes (images 35a,b and 48a,b), pies (images 36a,b and 40b), pretzels (images 37b and 38a,b), mugs (images 39b and 46a,b), hamburgers (images 41a,b and 45a,b), and hot dogs (images 43a,b). Note that one image in each respective image pair 44a,b and 47a,b also defines an initial image, but it can not be determined from FIG. 3 which ones of the images were initial images and which ones of the images were altered. Four of the images (and one "missing" image) represent images which have been changed from the initial set, in a manner which will be described in relation to step 62.

The number of types of basic images which are selected by the controller to form the initial set may be fewer or greater than the number of types of images available for a particular theme. For example, according to Table 4, there are 7 available basic images for the "Fast Food" theme. These basic images include: french fry, sundae, pie, pretzel, hamburger, hot dog and mug. As noted above, all 7 of these basic images were selected by the controller to form the initial set in the example game shown in FIG. 3. Alternatively, the controller might have selected one, two, three, four, five or six of these images to form the initial set.

In step 58, the controller identifies a number of target display positions, meaning positions which are available to display images, but which may or may not ultimately display an image. The number of available display positions is generally determined by the game program and the size and resolution of the display screen. In an embodiment of the MIRROR, MIRROR™ game using a touch-screen, for example, the number of available display positions is defined by an x-y matrix of 170×170, or 28,900 points on which the images may be displayed. In this touch-screen embodiment, or in any game having such a fine resolution display, the game program preferably includes means for spacing out the displayed images so that they do not substantially overlap. In one embodiment of the MIRROR, MIRROR™ game, for example, this is accomplished by a subroutine of the game program which checks the proximity of each selected display position to previously selected display positions and, if the selected display position is too close, the selection is re-accomplished until an appropriate display position is determined.

In the MIRROR, MIRROR™ game, the target display positions are selected randomly relative to one of the pictures 30,32 (subject to the condition that they do not substantially overlap) and corresponding target display positions are used in the other one of the pictures 30,32 to define a plurality of target display "pairs." It will be appreciated, however, that target display positions may be selected relative to fewer or greater than two pictures and, where multiple pictures are employed, the the target display positions need not correspond from one picture to the next.

In step 60, the controller 12 identifies a number of the basic images which are to be changed from the initial set. In one embodiment, the number of images to be changed is predetermined according to the game program and may increase for different levels of game play. As noted above, the illustrated example of the MIRROR, MIRROR™ game includes five images which are changed from the initial set. The images which are to be changed will hereinafter be identified as "change candidates." It will be appreciated that the controller may designate any number from zero to all of the basic images in the initial set as change candidates. In one embodiment of the MIRROR, MIRROR™ game, the change candidates are randomly selected by the controller from the initial set. The changed images in the MIRROR, MIRROR™ game may be selected by the controller in any combination relative to the initial set of images eligible for display. Thus, for example, any number of the initial set of images which are eligible for display in picture 30 may be selected for change and any number of the initial set of images which are eligible for display in picture 32 may be selected for change as long as the total number of images selected for change does not exceed the predetermined number of images which are to be changed (e.g., five in the illustrated example).

In step 62, the controller identifies, for each change candidate, the manner in which the image is to be changed. The manner of change is randomly selected by the controller from among various options stored in the game memory. The various options may vary according to the type(s) of image(s) which are to be changed. Some exemplary ways in which the change candidates may be changed in one embodiment of the MIRROR, MIRROR™ game are identified below. It will be appreciated, however, that the present invention is not limited to use with the change options described below, but rather may be used with any of several alternative or additional options which may be envisioned by the game designer.

1. Replace Image.

This option causes the controller to replace the change candidate's initial image with an alternate image selected from game memory according to the selected theme. For example, consider the non-matching image pair 47a,b (hot dog and pie) of the MIRROR, MIRROR™ game (FIG. 3). It can not be determined from FIG. 3 which of these images are initial images, but it is known according to the game logic that the images 40a,b must initially have been matching images (e.g., both hot dogs or both pies), and that the non-matching images are a result of the controller replacing one of the original images with an alternate image. Thus, if the initial images were both hot dogs, the controller has replaced the change candidate's initial image (a hot dog) initially to be displayed at display field 47b with the image of a pie. Conversely, if the initial images were both pies, the controller has replaced the change candidate's initial image (a pie) initially to be displayed at display field 47a with the image of a hot dog.

The number of alternatives for the option of replacing the image generally corresponds to the number of available images for the selected theme. For a theme having n available images, there are n-1 alternative choices for replacing any of the images in either picture. For example, if the selected theme is "Fast Food," as in the illustrated embodiment of the MIRROR, MIRROR™ game (FIG. 3), there are 7 available images for that theme and therefore there are 6 alternative choices for replacing any of the images in either picture. It may be observed from Table 4 that, depending on the choice of themes in the MIRROR, MIRROR™ game, there are 3 to 36 available images, and therefore there are two to thirty-five alternative choices for replacing the images.

2. Re-Orient Image.

This option causes the controller to replace the change candidate's initial image with a re-oriented version of the same image. For example, consider the image pair 39*a,b* of mugs shown in the exemplary MIRROR, MIRROR™ game (FIG. 3). The mug image 39*a* has a straw tilted to the right, whereas the mug image 41*b* has a straw tilted to the left. Mug image 41*b* (with a straw tilted to the left) is the initial image, as may be observed by viewing the matching pairs of mugs at image pair 46*a,b*, each with the straw tilted to the left. Mug image 41*a* (with a straw tilted to the right) is a re-oriented version of the initial mug image to be displayed at display field 41*a*, wherein the controller has re-oriented or flipped the image initially to be displayed at display field 41*a* (having a straw tilted to the left) such that the straw now tilts to the right.

Although the step of re-orienting image(s) is accomplished in the illustrated embodiment of the MIRROR, MIRROR™ game by flipping or displaying the "mirror image" of the change candidate's initial image(s), it will be appreciated that the step of re-orienting image(s) may be accomplished in other games or embodiments by a variety of additional or alternative ways, which might include, for example, placing the change candidates' image(s) upside down or at an angle with respect to the initial image(s) to be displayed. The number of alternatives for re-orienting the image generally varies according to the game program, specifically on the number of different orientations which are defined by the game program. For example, if the game program defines only two different orientations (e.g., left and right "mirror" images) for any particular image, this defines two alternative choices for re-orienting the image(s).

3. Change Size of Image.

This option causes the controller to replace the change candidate's initial image with a larger or smaller version of the same image. None of the non-matching images shown in the exemplary MIRROR, MIRROR™ game (FIG. 3) have been altered according to this option. It will be appreciated, however, that virtually any of the images shown in FIG. 3 may be reduced or enlarged, preferably to such a degree that the change may be discerned with relative ease by the player(s).

The number of alternatives for the option of changing the size of the image varies according to the game program, specifically on the number of different sizes which are defined by the game program. For example, if the game program defines two different sizes for any particular image, this defines two alternative choices for the change of size option.

4. "Erasing" the Image.

This option causes the controller to "erase" the change candidate's image, thereby replacing the change candidate's initial image with a display matching the game background. For example, consider image pair 40*a,b* of the exemplary MIRROR, MIRROR™ game (FIG. 3). Each of the display fields 40*a,b* initially were to display images of pies, but the controller has erased the image of the pie in display field 40*a*. The number of alternatives for this option is limited to two, e.g., with the image being either "on" or "off."

5. Changing the Color of the Image.

This option causes the controller to replace the change candidate's image initially to be displayed with a different color version of the same image. None of the non-matching images shown in the exemplary MIRROR, MIRROR™ game (FIG. 3) have been altered according to this option. It will be appreciated, however, that virtually any of the images shown in FIG. 3 may be displayed in a different color, preferably to such a degree that the change may be discerned with relative ease by the player(s).

The number of available alternatives for the changing color option varies according to the game program, specifically on the number of different colors which are defined by the game program. For example, if the game program defines three different colors for any particular image, this defines three alternative choices for the changing color option.

It will be appreciated that several of the above options may be combined to effect multiple changes for a selected image. Thus, for example, a changed image might have a different color and size; color and orientation; size and orientation; or color, size and orientation relative to a basic image. A change candidate image which has been changed will hereinafter be designated a "changed image."

Finally, at step 64, the controller generates a display of the images and changed images identified through steps 52 through 62. The images and changed images are displayed (or not displayed, if the image(s) are turned "off") in the target display positions identified at step 58. In the MIRROR, MIRROR™ game, as shown in FIG. 3, this display comprises two side-by-side pictures 30,32 defining a plurality of image pairs, wherein some of the images define basic images which have been retrieved from the game memory and some of the images define changed images which have been derived from the basic images by one or more of the selected change options as described above. Game play may then commence according to the game program, using the images and changed images displayed at step 64.

It will be understood that the image generation and display system of the present invention, whether employed in the MIRROR, MIRROR™ game or any other video game, allows for the generation and display of virtually an unlimited number of images. The present invention may nevertheless be implemented with relatively inexpensive memories having moderate capacity. This is because only the basic images and the change options are stored in game memory; it is thereby not necessary to store a complete library of basic and changed images. This is an important benefit because, relative to other games which require such a large "library" of images, it allows for a substantial reduction in required memory capacity. This is particularly important where the game memory must be shared with multiple games, such as in a multi-game touch-screen platform. One embodiment of the MIRROR, MIRROR™ game, for example, is implemented in a touch-screen platform having 6 megabytes of graphics memory and 2 megabytes of code memory allocated among several games. In this embodiment, the MIRROR, MIRROR™ game itself requires only 100 kilobytes of graphics memory and 50 kilobytes of code memory.

The reduction in memory capacity permitted by the present invention is perhaps best illustrated by comparing the memory requirements of the MIRROR, MIRROR™ game to competing MIRROR, MIRROR™-style games which do not utilize principles of the present invention. One such competing game is PHOTO HUNT™, commercially available from Merit Industries, Inc., Ben Salem, Pa. In the PHOTO HUNT™ game, which is offered in only a one-player mode, side-by-side photographs are displayed on the screen and the player accumulates points by identifying various differences between the photographs. The PHOTO HUNT™ game stores each pair of photographs, representing both the "initial" and "changed" version, in a CD ROM memory having a 650 megabyte capacity. Notwithstanding this robust memory capacity, the PHOTO HUNT™ game is capable of displaying only a limited number of images retrieved from the CD ROM, and thereby some of the same images may be shown more than once during game play. The differences associated with the photographs are permanently encoded in the CD ROM. The MIRROR, MIRROR™ game, conversely, uses an order of magnitude less memory, yet is able to display a virtually unlimited number of unique pictures such that there is an infinitessimal likelihood that any picture will ever be shown more than once during game play.

The present invention is easily adaptable to generate and display animated images as well as static images. Generally, all of the steps identified in the flow chart of FIG. 5 are applicable to the display of animated characters as well as static characters. In games displaying animated characters, the controller must generally perform the additional steps of identifying basic animation(s) for the character(s) and, for those animations which are to be changed, identifying how to change the animations. The "basic" animation identified by the controller might include a prescribed manner or direction of movement of an image, and the animation might be changed by altering the manner or direction of movement of the image. For example, in a "Fish" theme, the controller might identify a generally left-to-right movement of a particular fish as the "basic animation" to be shown in one of pictures 30,32 and then modify the animation to show a generally right-to-left movement of that fish in the other of pictures 30,32.

Figure 6:
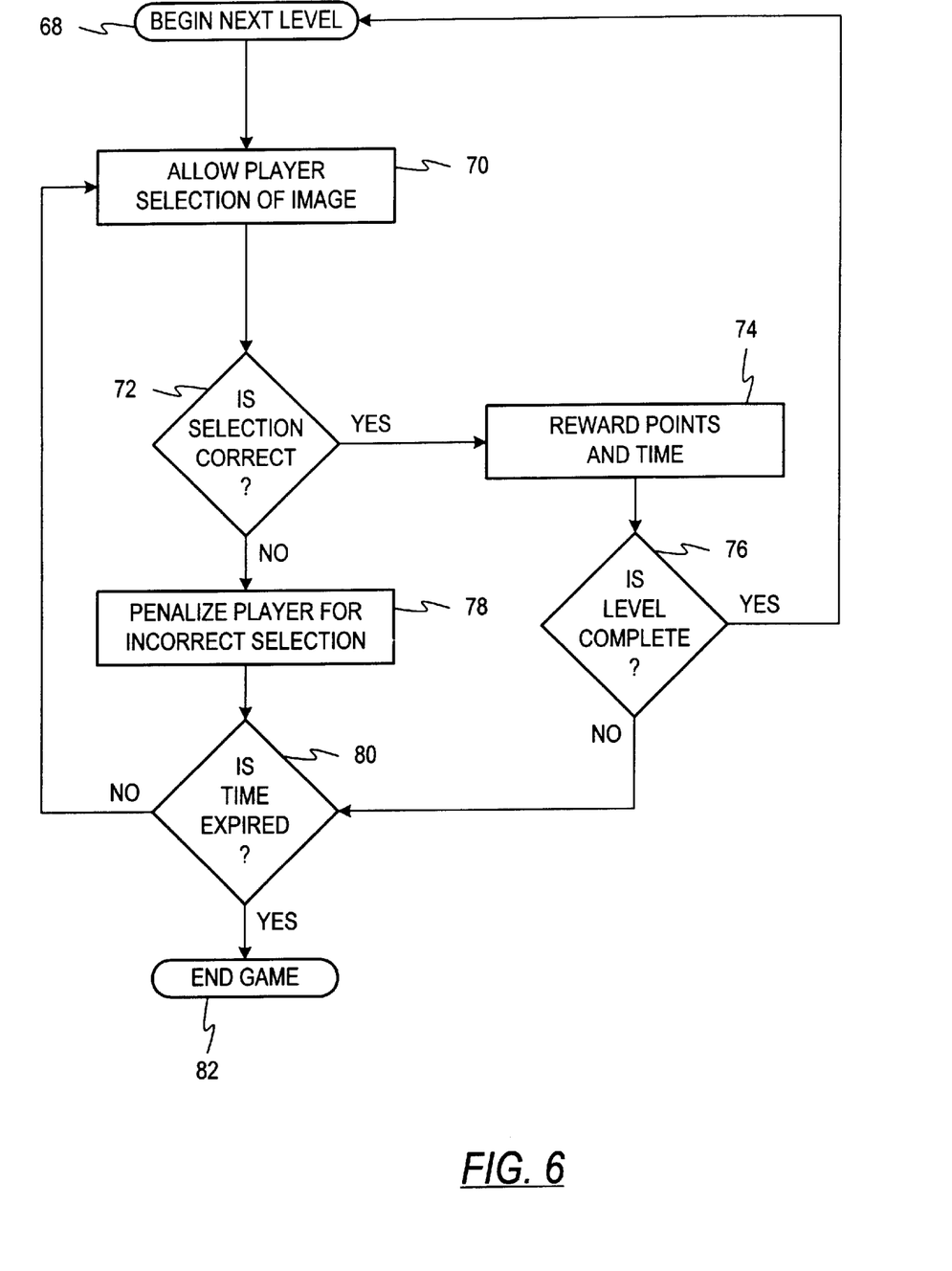
FIG. 6 is a flow diagram useful for describing various embodiments of the MIRROR, MIRROR™ game implementing the image generation and display system of the present invention.

The MIRROR, MIRROR™ game is adapted for one- or two-person play, each mode which will be described in relation to FIG. 6. In one embodiment, both the one- and two-person games are implemented with a touch-screen display. In either the one- or two-person game, step 68 identifies the start of a particular level (e.g., the first level upon the start of the game). This step is commenced with a "fresh" display screen, including side-by-side pictures 30,32 generated by the game controller according to the steps in the flowchart of FIG. 5. Each picture 30,32 includes a number of images at various locations, including images which identically match those displayed at corresponding locations in the other picture 30,32 and images which do not match those displayed at corresponding locations in the other picture 30,32.

Upon start of the game, the controller identifies a time limit for the game. In one embodiment, the time limit is determined by allocating a predetermined "base" time which is decremented as time progresses during play of the game. Extra time or time penalties may be provided during game play to the player(s) as the game progresses through the various levels based on correct or incorrect selections. In one embodiment of a one-player game, about one minute is allocated as the designated "base" time for a game, with five seconds additional time being awarded upon completions of levels 1–10, three seconds additional time awarded upon completion of levels 11–15 and no additional time awarded for any levels thereafter. Within these time constraints, the game otherwise has an unlimited number of levels. The two-person game in one embodiment similarly includes a designated "base" time and might also award extra time upon completion of the various levels.

At step 70, in the one-person mode, the player identifies non-matching portions of the pictures 30,32 by pressing the touch screen over appropriate area(s) of either picture 30 or picture 32. If the selection correctly identifies a non-matching image (step 72), the controller highlights the image, rewards points and extra time to the player as appropriate for that level (step 74). If the player makes an incorrect selection of image at step 70, the player is penalized by deducting time and/or deducting points from the player's score (step 78).

In a preferred embodiment of the two-person game, the two players play the game simultaneously on a common or "shared" display screen containing pictures 30,32. This is accomplished by designating one of the pictures 30,32 (e.g., picture 30) as the first player's picture and the other one of the pictures 30,32 (e.g., picture 32) as the second player's picture. In this embodiment, the players make their selections at step 70 by pressing only their designated picture 30,32 over the appropriate image(s) displayed thereon. Where, for example, the pictures 30,32 define various pairs of images displayed at corresponding locations, wherein the first "half" of each pair is displayed on picture 30 and the second "half" of the pair is displayed on picture 32, the first player may select the image pair by pressing the touch screen over the first half of the image (on picture 30) and the second player may select the image pair by pressing the touch screen over the second half of the image (on picture 32). The image pair may consist of non-matching images, as has heretofore been described. In one embodiment, if either of the players' selections correctly identify an image from a non-matching image pair (step 72), the controller highlights each image defining the pair, rewards points and extra time to the player having made the correct selection as appropriate for that level (step 74); otherwise, if the players' selections are incorrect, the controller might penalize the player(s) in generally the same manner described in relation to the one-person game.

In one embodiment of the two-person game, points are awarded for each correct selection only to the player who is first to press the touch screen over the appropriate area of picture 30 or 32. Thus, for example, with reference to FIG. 3 which shows five non-matching pairs of images, points will be awarded for each non-matching image to the player associated with picture 30 (e.g., "Player 1") or to the player associated with picture 32 (e.g., "Player 2") based on which player is the first to press his or her touch screen over each respective non-matching image. Specifically, with reference to the non-matching images at display fields 36a,b, player 1 will be awarded for the selection of the non-matching images if player 1 presses the touch screen over display field 36a before player 2 presses the touch screen over display field 36b and, conversely, player 2 will be awarded for the selection of the non-matching images if player 2 presses the touch screen over display field 36b before player 2 presses the touch screen over display field 36a. Points will be awarded in similar fashion to the first player to touch his or her touch screen over the appropriate area for the non-matching images at display fields 34a,b, 40a,b, 41a,b and 42a,b.

Generally, therefore, in a game level having five non-matching images, the two-player game may result in five possible outcomes: player 1 having selected no images and player 2 having selected five images; player 1 having selected one image and player 2 having selected four images; player 1 having selected two images and player 2 having selected three images; player 1 having selected three images and player 2 having selected two images; player 1 having selected four images and player 2 having selected one image; or player 1 having selected five images and player 2 having selected no images.

In an alternative embodiment, the two-person game might be implemented in conventional fashion by the first and second players taking turns on separate display screens dedicated for each respective player, in which case each players' selections might be accomplished in generally the same manner as in the one-player mode, by pressing the touch-screen over picture 30 or 32 (e.g., over either "half" of the images).

If the player's selection (in the one-player mode or in the alternative two-player mode), or the players' combined selections (in the preferred two-player mode) completes a particular level (i.e., if all of the non-matching images at that level have been selected), the game returns to step 68 to begin the next level with another "fresh" display of side-by-side pictures 30,32. Otherwise, if there are non-matching images at that level which have yet to be selected, and if the time has not yet expired (step 80), game play continues at that level with the player (or players) identifying other non-matching portions of the pictures 30,32 at step 70. Game play ends (step 82) when time has expired.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of generating a video game display defining first and second pictures, the method comprising the steps of:
    defining under control of a game controller target numbers of video images eligible for display in said pictures;
    defining under control of a game controller target display positions in said pictures;
    identifying under control of a game controller a number of basic images eligible for display in said first picture;
    selecting under control of a game controller a number of change candidates from among the basic images eligible for display in said second picture;
    selecting under control of a game controller a change option for each respective change candidate;
    executing under control of a game controller the change option selected for each respective change candidate to define a number of changed images eligible for display in said second picture;
    displaying under control of a game controller a number of the changed images and a number of unchanged basic images eligible for display in said second picture at selected ones of said target display positions; and
    allowing a user to compare the changed images and the unchanged basic images of the second picture with the basic images of the first picture and to select under control of a game controller which of the images do not match.

2. The method of claim 1 wherein the step of defining target numbers of video images comprises selecting a predetermined target number of video images for each of said pictures.

3. The method of claim 1 wherein the step of defining target numbers of video images comprises selecting a randomly determined target number of video images for each of said pictures.

4. The method of claim 1 wherein the step of defining target numbers of video images comprises selecting an identical target number of video images for each of said pictures.

5. The method of claim 1 wherein the step of defining target numbers of video images comprises selecting for each game level of the video game a predetermined target number of video images for each of said pictures.

6. The method of claim 1 wherein the step of defining target display positions comprises defining a number of target display positions in each respective picture corresponding to the target number associated with each respective picture.

7. The method of claim 1 wherein the step of defining target display positions comprises randomly selecting target display positions in at least one of said pictures.

8. The method of claim 7 wherein the step of defining target display positions comprises randomly selecting target display positions in said first picture and selecting corresponding display positions in said second picture.

9. The method of claim 7 wherein the step of defining target display positions comprises:
    (a) consecutively selecting a number of target display positions in said first picture corresponding to the target number associated with the first picture;
    (b) determining, for each consecutive selected target display position, whether the selected target display position substantially overlaps any previously selected target display positions; and
    (c) if a positive determination is made at step (b), repeating steps (a) and (b) until the selected target display position does not substantially overlap any previously selected target display positions.

10. The method of claim 7 wherein the video game display defines exactly two pictures, the step of defining target display positions comprising randomly selecting target display positions in said first picture and selecting corresponding display positions in said second picture so as to define a plurality of paired target display positions.

11. The method of claim 1 wherein the step of identifying basic images comprises identifying a number of basic images in each respective picture corresponding to the target numbers associated with each respective picture.

12. The method of claim 1 wherein the step of identifying basic images comprises randomly selecting basic images eligible for display in at least one of said pictures.

13. The method of claim 1 wherein the step of identifying basic images comprises randomly selecting basic images eligible for display in said first picture and selecting corresponding basic images eligible for display in said second picture.

14. The method of claim 13 wherein the video game display defines exactly two pictures, the step of identifying basic images comprising randomly selecting basic images eligible for display in said first picture and selecting corresponding basic images eligible for display in said second picture so as to define a plurality of paired images eligible for display.

15. The method of claim 1 wherein the step of selecting change candidates comprises selecting a number of change candidates.

16. The method of claim 15 wherein the step of selecting change candidates comprises randomly selecting said number of change candidates from among the basic images eligible for display in said pictures.

17. The method of claim 1 wherein the step of selecting change candidates comprises selecting a predetermined number of change candidates.

18. The method of claim 1 wherein the step of selecting change candidates comprises selecting a randomly determined number of change candidates.

19. The method of claim 1 wherein the step of selecting change candidates is accomplished independently for each level of the video game.

20. The method of claim 1 wherein the step of selecting a change option for each respective change candidate comprises randomly selecting, for each change candidate, a change option from among a plurality of available change options stored in game memory.

21. The method of claim 1 wherein the step of selecting a change option for each respective change candidate comprises selecting, for each change candidate, a change option from among a plurality of available change options stored in game memory.

22. The method of claim 20 wherein the available change options are selected from the group consisting of a replace image option, a re-orient image option, an erase image option, a change size option, a change color option and a change animation option.

23. The method of claim 1 wherein the selected change option comprises a replace image option, the step of executing the selected change option comprising replacing a basic image associated with the change candidate with an alternate basic image selected from a game memory.

24. The method of claim 1 wherein the selected change option comprises a reorient image option, the step of executing the selected change option comprising replacing a basic image associated with the change candidate with a re-oriented version of the basic image.

25. The method of claim 1 wherein the selected change option comprises a change size option, the step of executing the selected change option comprising replacing a basic image associated with the change candidate with a different size version of the basic image.

26. The method of claim 1 wherein the selected change option comprises an erase image option, the step of executing the selected change option comprising inhibiting display of the basic image associated with the change candidate.

27. The method of claim 1 wherein the selected change option comprises a change color option, the step of executing the selected change option comprising replacing a basic image associated with the change candidate with a different color version of the basic image.

28. The method of claim 1 wherein the selected change option comprises a change animation option, the step of executing the selected change option comprising replacing an animation of the basic image associated with the change candidate with a different animation of the basic image.

29. A video game operable to generate a display defining first and second pictures, the video game comprising:
means for defining target numbers of video images eligible for display in said pictures;
means for defining target display positions in said pictures;
means for identifying a number of basic images eligible for display in said first picture;
means for selecting a number of change candidates from among the basic images eligible for display in said second picture;
means for selecting a change option for each respective change candidate;
means for executing the change option selected for each respective change candidate to define a number of changed images eligible for display in said second picture;
means for displaying a number of the changed images and a number of unchanged basic images eligible for display in said second picture at selected ones of said target display positions; and
means for allowing the user to compare the changed images and the unchanged basic images of the second picture with the basic images of the first picture and to select which images do not match.

30. A method for playing a video game comprising:
displaying a first picture having a random selection of basic images within the first picture, the basic images being located located in picture, the basic images being located in randomly selected display positions;
displaying a second picture retaining a number of said unchanged basic images and further including changed images, said changed images being randomly altered versions of said basic images; and
allowing a player to compare the changed images and the unchanged basic images of the second picture with the basic images of the first picture to identify which images do not match.

31. A video game comprising:
a display displaying a first picture and a second picture, said first picture including a randomized selection of basic images within said first picture, said second picture including one or more of unchanged basic images and one or more changed images, said changed images being randomly altered versions of said basic images; and
an interface electrically communicating with said display that accepts selections from a player, whereby the player compares the changed images and the unchanged basic images of the second picture with the basic images of the first picture and identifies which images do not match.

* * * * *

UNITED STATES PATENT AND TRADEMARK OFFICE
CERTIFICATE OF CORRECTION

PATENT NO. : 6,287,197 B1
DATED : September 11, 2001
INVENTOR(S) : Vince Dickinson et al.

It is certified that error appears in the above-identified patent and that said Letters Patent is hereby corrected as shown below:

<u>Column 16,</u>
Line 28, delete "located located in picture, the basic images being".

Signed and Sealed this

Twenty-third Day of April, 2002

Attest:

*Attesting Officer*

JAMES E. ROGAN
*Director of the United States Patent and Trademark Office*